United States Patent [19]
Urban et al.

[11] 3,746,209
[45] July 17, 1973

[54] CLOSING DEVICE FOR GAS AND LIQUID CONTAINERS

[75] Inventors: Norbert Urban, Bienrode; Hans Richters, Wolfsburg, both of Germany

[73] Assignee: Volkswagenwerk Aktiengesellschaft, Wolfsburg, Germany

[22] Filed: Sept. 2, 1971

[21] Appl. No.: 177,340

[30] Foreign Application Priority Data
Sept. 5, 1970 Germany............... P 20 44 182.1

[52] U.S. Cl. ........................... 220/40 R, 220/46 R
[51] Int. Cl. ........................................ B65d 41/05
[58] Field of Search ..................... 220/40, 24, 46

[56] References Cited
UNITED STATES PATENTS
3,386,611  6/1968  Crute ............................... 220/40 R
3,640,425  2/1972  Auer ............................... 220/40 R

*Primary Examiner*—George T. Hall
*Attorney*—Granville M. Brumbaugh, Ronald B. Hildreth et al.

[57] ABSTRACT

A cap for closing the inlet pipe of a gas and/or liquid container. The cap includes a number of interacting parts which are operative to compress a seal arranged between the cap and the inlet pipe without sliding contact when the cap is closed, and operative to release the seal without sliding contact when the cap is opened.

8 Claims, 3 Drawing Figures

Patented July 17, 1973 3,746,209

3,746,209

CLOSING DEVICE FOR GAS AND LIQUID CONTAINERS

BACKGROUND OF THE INVENTION

The present invention relates to a closing device for a gas and/or liquid container. More particularly, the present invention relates to a lid or cap for closing the inlet pipe of a motor vehicle fuel tank.

To maintain clean air, the sealing requirements of closing devices for fuel tanks of motor vehicles have become increasingly stringent. The closing devices or caps of the type disclosed in the West German Pat. No. 1,013,979, which are generally used for fuel tanks, no longer meet todays needs. Such closing devices act in a well-known manner as a bayonet catch or seal in recesses in the fuel tank inlet pipe. The contact pressure of the seal against the inlet pipe is achieved by means of a spring. This arrangement prevents, or at least partially prevents the seal from turning on the inlet pipe when the closing device is opened or closed, thus preventing rapid wear of the seal due to friction. However, the sealing contact pressure produced by this arrangement is so low that the seal has a tendency to lift off the inlet pipe, and thus leak, due to the expansion of gases in the fuel tank, particularly at elevated temperatures. Such a tendency to leak is ecologically unacceptable: the gases in a fuel tank can no longer be allowed to vent through the tank cap directly into the atmosphere.

Closing devices in the form of a simple screw cap with a glued-in seal, while still in frequent use, can also no longer comply with todays requirements. Such a closing device has the disadvantage of tightening itself when there is a considerable increase in the temperature of the fuel tank and, in turn, an expansion of gases. When this occurs the cap can be screwed open only with difficulty.

Excessive wear of the seal due to friction, when the seal is rotated with the cap with respect to the inlet pipe during opening or closing, is also a well-known problem with this type of closing device.

SUMMARY OF THE INVENTION

An object of the present invention, therefore, is to provide a device or cap for closing the inlet pipe of a fuel tank which does not exhibit the disadvantages of the prior art closing devices described above.

More particularly, it is an object of the present invention to provide an inlet pipe cap which is able to effect any desired sealing contact pressure with the inlet pipe while requiring minimum torque to open and close.

A further object of the present invention is to provide an inlet pipe closing device having a protective arrangement for holding the seal to prevent relative rotation, under load, between the seal and the cap or the seal and the inlet pipe which would result in the destruction of the seal.

A still further object of the present invention is to provide an inlet pipe cap having a sealing surface so arranged that neither shrinkage nor expansion of the seal will adversely effect the tightness of closure.

These objects, as well as other objects which will become apparent in the discussion that follows, is achieved, according to the present invention, by constructing the cap of several parts or members in the following manner:

A closing member, having lugs or catches on its edge, is provided in the conventional manner to lock onto the end of the fuel tank inlet pipe. The lugs are arranged to engage with cutouts in the inlet pipe when the closing member is placed over the end of the pipe and rotated.

A screw-shaped insert or intermediate member is attached to the closing member on the side thereof which faces the inlet pipe. This insert member is provided with an external thread which turns inward in a direction opposite to the direction of rotation that closes the cap. In addition, a seal pressing member is provided in threaded engagement with the insert member for compressing a seal arranged between the cap and the inlet pipe when the pipe is closed by the cap. Due to the threaded engagement between the seal pressing member and the insert member, the seal pressing member does not rotate when the closing member is screwed onto or off of the inlet pipe.

In its preferred embodiment, the closing member used in the cap according to the present invention takes the shape of a cup, with the lugs or catches provided on its vertical cylindrical portion adjoining the lowermost edge. To assist in proper opening and closing of the cap the inlet pipe is provided with ears or stops preventing excessive rotation in both directions of turning.

A centering pipe is inserted and attached to the inlet pipe and a circular or ring-type seal is inserted between the centering pipe and inlet pipe. This arrangement prevents the seal from being damaged by a fuel pump nozzle when the tank is being filled and yet permits the seal to be easily replaced.

The seal pressing member is preferably designed in the shape of a hat and has a vertical outer edge which is guided by the vertical portion of the closing member. A catch or lug is provided both in the seal pressing member and the closing member to provide a mutual stop.

The seal pressing member is of conical shape in the area that comes in contact with the seal. The seal pressing member and the centering pipe thereby form a conical, inwardly narrowing gap when the cap is in place. As a result, the seal always retains the same thickness relative to the sealing surface notwithstanding any expansion or contraction of the ring.

Finally, a spring is provided between the closing member and the seal pressing member to hold or lock these two members in their respective positions.

DESCRIPTION OF THE PREFERRED EMBODIMENT

Figure 3:
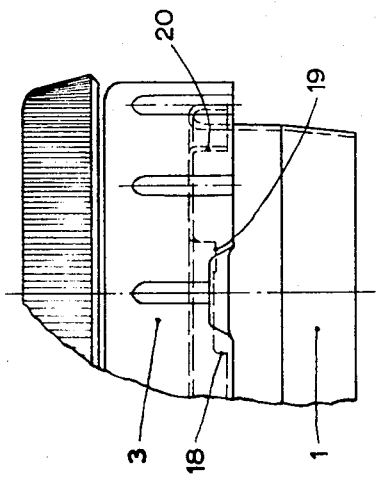
FIG. 3 is an elevational view of a portion of the closing device of FIG. 1 taken from the line III — III in FIG. 2

The preferred embodiment of the arrangement, according to the present invention, for closing a gas and/or liquid container will now be described in connection with FIGS. 1 – 3 of the drawing. These three figures provide different views of the same device.

Figure 1:
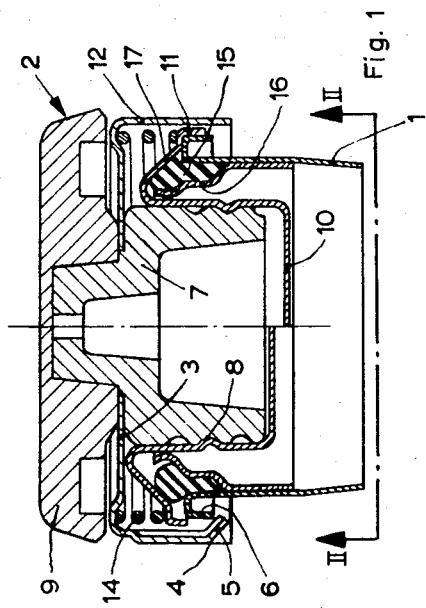
FIG. 1 is a cross-sectional view of a closing device according to the preferred embodiment of the present invention. The left half of the device is shown in the opened condition while the right half is shown in the closed condition.
Figure 2:
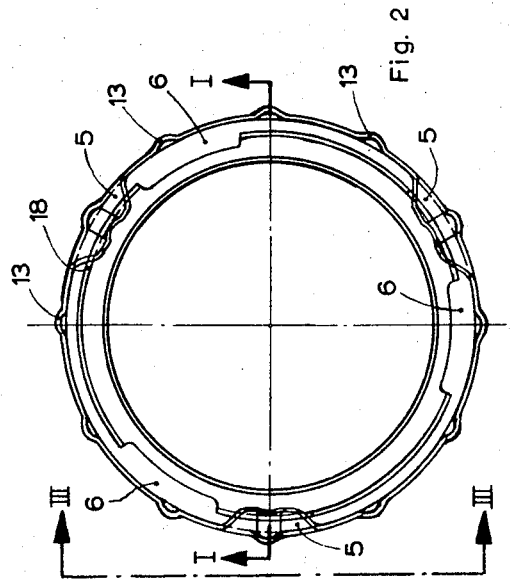
FIG. 2 is a bottom view of the closing device of FIG. 1 taken from the line 11 — II in FIG. 1.

FIGS. 1 – 3 show the end portion of an inlet or filler pipe 1 of a motor vehicle fuel tank closed by a cap, indicated generally by the reference numeral 2. The cap 2, which is constructed according to the preferred embodiment of the present invention, consists of several parts or members. A cup-shaped closing member 3 covers and engages the end of the inlet pipe 1 in a conventional manner. The lower edge 4 of the cylindrical vertical sides 12 of the closing member is provided with catches or lugs 5 that enter and engage in openings 6 in the U-shaped upper portion of the inlet pipe 1.

An intermediate insert member 7 is held at the center of the closing member 3 facing downward into the inlet pipe 1. The insert member 7 is provided with a screw thread 8 which turns inward in a direction opposite to the closing direction of the closing member 3.

Attached to the upper portion of the insert member 7 and closing member 3 is a tensioning ring 9 having a gripping surface so that the cap may be turned and tightened by hand.

The lower portion of the insert member 7 is screwed into a seal pressing member 10. The seal pressing member 10 is hat-shaped and has an outer cylindrical vertical edge 11 which is guided by the cylindrical vertical sides 12 of the closing member 3. A lug 13 is pressed into both the seal pressing member 10 and the closing member 3 to provide a mutual stop. The lugs 13 prevent the seal pressing member 10 from coming unscrewed and falling off the cap when the cap is not placed over the inlet pipe.

A spring 14 is inserted between the seal pressing member and the closing member so that these two members are self-locking. The inlet pipe 1 is provided with a closing stop 18 and an opening stop 20 to prevent excessive rotation of the cap 2.

A circular or ring-shaped seal 15 is retained between the inlet pipe 1 and a centering pipe 6 which is arranged within and attached to the inlet pipe 1. The supporting and sealing surfaces for the seal 15 are provided by the centering pipe 16 and the conically constructed region 17 of the seal pressing member 10. The centering pipe 16 and the conical sealing surface 17 taper inward in order to prevent a reduction in the sealing contact pressure if the seal 15 should shrink.

The closing device according to the present invention is screwed onto and seals the inlet pipe 1 in the following manner:

The cap 2 is placed onto the end of the inlet pipe 1 as shown in the left half of FIG. 1. In this position, the lugs 5 of the closing member 3 engage in the recesses 6 of the inlet pipe 1. Thereafter, the cap 2 is turned clockwise by means of the tensioning ring 9 towards the closing stop 18 arranged in the U-shaped end of the inlet pipe 1. As the tensioning ring 9 is turned, the seal pressing member 10 is pressed against the seal 15 by the left-hand thread of the insert member 7. When the cap 2 has been screwed as far as the stop 18 permits, it is secured in place by the self-locking properties of the thread 8, the ramp lugs 19 and the spring 14. This final position of the cap 2 is shown in the right half of FIG. 1.

In order to achieve the desired tightness of seal, the portion 17 of the seal pressing member 10 which provides the sealing surface is arranged in a protected position and the seal 15 is anchored between the inlet pipe 1 and the centering pipe 16. In addition, the seal 15 is protected by the centering pipe 6 against pinching or tearing by a fuel pump nozzle. Due to the conical arrangement of the sealing surfaces, a shrinkage or expansion of the seal 15 will have no effect on the sealing properties.

The procedure for unscrewing the cap 2 is as follows:

When the tensioning ring 9 is rotated counterclockwise by hand, the seal pressing member 10 is lifted off the seal 15 and the spring 14 is tensioned. As this occurs the lug 13 arrests the seal pressing member 10 at the closing member 3 as it does when the cap is screwed on. Premature sliding of the lugs 5 on the inlet pipe 1 is prevented by the three ramp lugs 19. Thereafter, rotation of the closing member 3 is arrested by its lug 5 at the opening stop 20. When this unscrewing procedure has been completed, the seal pressing member 10 will rest against the closing member 3 as shown in the left half of FIG. 1.

Only the tensioning ring 9 is actuated when the cap is screwed on or off. Since the seal pressing member 10 is free to rotate about the threads 8 with respect to the tensioning ring 9, closing member 3 and the insert member 7, the seal pressing member is operative to compress or release the seal 15 without sliding contact when the cap is closed or opened, respectively. The spring 14 prevents the seal pressing member 10 from rotating about the threads with respect to the closing member 3 when the cap is off the inlet pipe.

The closing device according to the present invention has a number of advantages not heretofore found in combination on container closing devices of the prior art. The cap is extremely easy to screw on and screw off of the inlet pipe while achieving an extremely high sealing contact pressure. In addition, the configuration of the centering pipe protects the seal against damage while permitting the latter to be easily replaced. This configuration also achieves an extremely tight seal notwithstanding shrinkage or expansion of the seal.

It will be understood that the above description of the present invention is suceptible to various modifications, changes and adaptations as will occur to those skilled in the art. It is therefore intended that the scope of the present invention be limited only by the following claims or their equivalents.

We claim:

1. A device for closing the inlet pipe of a container, said device including a cap comprising, in combination:
    a. a closing member having lug means at its outer edge for engaging cutouts in the inlet pipe to hold said closing member on said inlet pipe when said closing member is rotated in a closing direction;
    b. a screw-shaped insert member, attached to said closing member on the side thereof which faces said inlet pipe when said closing member is engaged with said inlet pipe, said insert member having a thread that turns inward in a direction opposite to said closing direction of said closing member; and
    c. a seal pressing member, in threaded engagement with said insert member,
    whereby said seal pressing member is operative to compress a seal arranged between the cap and the inlet pipe without sliding contact when said closing member is rotated in said closing direction and operative to release said seal without sliding contact when said closing member is rotated in said opposite direction.

2. The closing device defined in claim 1, wherein said closing member is cup-shaped and has approximately cylindrical vertical sides terminating in said outer edge, and wherein said lug means are arranged on said cylindrical vertical sides adjacent to said outer edge.

3. The closing device defined in claim 1, wherein said inlet pipe is provided with a closing stop to arrest rotation of said cap in said closing direction and an opening stop to arrest rotation of said cap in said opposite direction.

4. The closing device defined in claim 1, further comprising a centering pipe arranged within and attached to said inlet pipe; wherein said seal is arranged between said centering pipe and said inlet pipe.

5. The closing device defined in claim 1, wherein said closing member has vertically extending sides and wherein said seal pressing member is hat-shaped and has a vertically extending outer edge; whereby said vertical outer edge is arranged within and guided by said vertical sides.

6. The closing device defined in claim 5, wherein said closing member and said seal pressing member each have a lug which provides a mutual stop.

7. The closing device defined in claim 5, wherein the seal contacting surface of said seal pressing member is conically shaped.

8. The closing device defined in claim 1, further comprising a spring arranged between said closing member and said seal pressing member.

* * * * *